(12) United States Patent
Tsubaki

(10) Patent No.: US 9,258,484 B2
(45) Date of Patent: Feb. 9, 2016

(54) IMAGE PICKUP APPARATUS AND CONTROL METHOD FOR SAME

(71) Applicant: CANON KABUSHIKI KAISHA, Tokyo (JP)

(72) Inventor: Hidetoshi Tsubaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 14/310,378

(22) Filed: Jun. 20, 2014

(65) Prior Publication Data

US 2015/0009345 A1 Jan. 8, 2015

(30) Foreign Application Priority Data

Jul. 4, 2013 (JP) ................................. 2013-140843

(51) Int. Cl.
*H04N 5/232* (2006.01)
*H04N 5/357* (2011.01)

(52) U.S. Cl.
CPC ....... *H04N 5/23258* (2013.01); *H04N 5/23287* (2013.01); *H04N 5/3572* (2013.01)

(58) Field of Classification Search
CPC .......... H04N 5/23248; H04N 5/23258; H04N 5/23264; H04N 5/2328; H04N 5/23287; G02B 27/646
See application file for complete search history.

(56) References Cited

U.S. PATENT DOCUMENTS

| | | | | |
|---|---|---|---|---|
| 8,294,773 B2* | 10/2012 | Oshino | .............. | H04N 5/23248 348/208.6 |
| 8,922,664 B2* | 12/2014 | Oshino | .............. | H04N 5/23248 348/208.99 |
| 2010/0265343 A1* | 10/2010 | Lee | ...................... | G02B 27/646 248/208.7 |
| 2010/0295956 A1* | 11/2010 | Goto | .................. | H04N 5/23248 348/208.6 |
| 2011/0149096 A1* | 6/2011 | Matsuyama | ....... | H04N 5/23248 348/208.6 |

FOREIGN PATENT DOCUMENTS

| | | |
|---|---|---|
| JP | 3003370 B2 | 1/2000 |
| JP | 2012-231262 A | 11/2012 |

* cited by examiner

*Primary Examiner* — Daniel M Pasiewicz
(74) *Attorney, Agent, or Firm* — Fitzpatrick, Cella, Harper & Scinto

(57) ABSTRACT

An image pickup apparatus performs image shake correction by driving a correction member which is movable for image shake correction. An image sensing device receives light focused by an imaging optical system and then photoelectrically converts the optical image into an image signal so as to output the image signal. An attitude sensor unit detects the attitude of the image pickup apparatus, and a drive control unit performs drive control of the correction member and position detection. A geometric deformation amount calculating unit decomposes distortion of an image into a first distortion component which varies due to the driving of the correction member and a second distortion component which does not vary due to the driving of the correction member so as to calculate correction values for the first and second distortion components. An image processing unit corrects the first and second distortion components by image processing based on the calculated correction values.

12 Claims, 8 Drawing Sheets

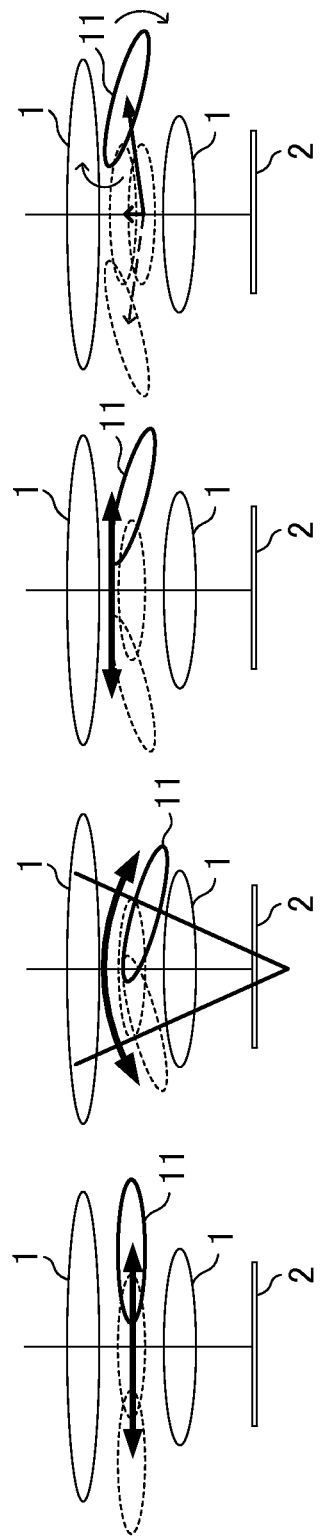

FIG. 10
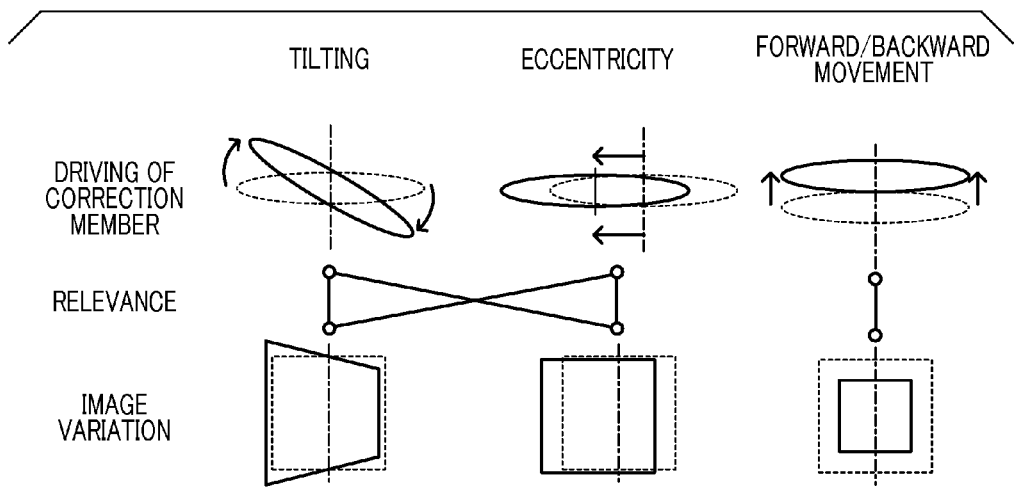
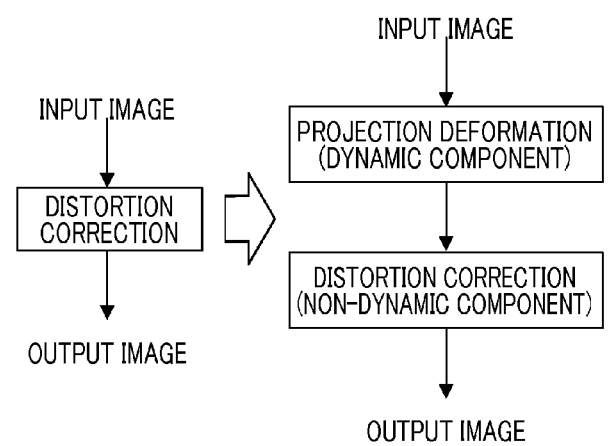
FIG. 11A   FIG. 11B

IMAGE PICKUP APPARATUS AND CONTROL METHOD FOR SAME

BACKGROUND OF THE INVENTION

1. Field of the Invention

The present invention relates to a technique for reducing image shake caused by hand shaking or the like when shooting photos.

2. Description of the Related Art

In recent years, there have been developed image shake correcting devices for correcting image shake caused by hand shaking or the like as image pickup apparatuses are made smaller in size. An image shake correction mechanism which is available for both still image shooting and moving image shooting while preventing an increase in the size of the image pickup apparatus suppresses image shake by shifting a part (correction member) of a lens system. A method for moving a correction lens within a plane perpendicular to the optical axis plane has become popular.

As a method for suppressing degradation in the optimal image forming performance while broadening an image shake correction angle, Japanese Patent No. 3003370 discloses a configuration in which a correction member is pivoted about a point on the optical axis. There has also been proposed a high level method for moving a lens system in a three-dimensional manner or changing the attitude of the lens system in respect to the position and attitude of the same. The method can suppress degradation in the optimal image forming performance relating to sharpness and blur even when a correction angle is broadened.

In recent years, with the rise of electronic correction and circuit techniques, so-called an electronic image shake correction function has been implemented for electronically correcting image distortion such as radial distortion or the like. When electronic image shake correction is used in combination with optical image shake correction, there have been proposed some measures for performing electronic correction by moving distortion image data or correction data in translation parallel to an optical center coordinate by monitoring the movement of the optical center coordinate on an image plane in concert with the movement of an optical image (see Japanese Patent Laid-Open No. 2012-231262).

When image shake is stopped by moving a correction member in a three-dimensional manner or changing the attitude thereof through image shake correction control in order to extend a range of correction, the effect of suppressing degradation in the optimal image forming performance relating to sharpness and blur is obtained. On the other hand, distortion characteristics are reduced, resulting in the occurrence of image distortion in which the shape of an image significantly and complexly varies due to the driving of the correction member. While design has conventionally been made so as to cause an image shift only to suppress the occurrence of eccentric distortion aberration as much as possible upon shifting a correction lens or the like, such image distortion occurs because the eccentric distortion aberration is tolerated in order to suppress sharpness and blur.

Phenomenon under the image shake correction control for image distortion correction is as follows:
(1) Handling of image distortion information and correction information about image distortion is complicated.
(2) Higher-order geometric deformation processing needs to be performed for image distortion correction.
(3) An increase in resources such as data storage capacity must be taken for achieving higher precision.

Firstly, a description will be given of (1). An optical system upon lens driving is a decentered system, and the adverse effect of image distortion at high image height needs to be quantitatively grasped with high precision in imaging system applications. Thus, it is difficult to quantitatively handle the adverse effect of image distortion by classifying image distortion into properties such as distortion aberration and eccentric aberration for correcting the adverse effect of image distortion by using a quantitation indicator obtained from an optical CAD (Computer-Aided Design) or actual measurement in accordance with the paraxial theory and aberration theory. More specifically, image distortion information and correction information about image distortion can only be acquired and measured, such that all the influences of various image distortion factors are included in the promiscuous form, by means of ray tracing with an optical CAD or measurement of the amount of movement of an ideal point on an actual chart under the adverse effect of image distortion.

With regard to (2), image distortion needs to be interpreted in a comprehensive manner, so that image distortion must be handled as distortion which nonlinearly varies in a spatially complex manner. Consequently, when an attempt is made to faithfully correct image distortion, a geometric transformation circuit which is capable of performing higher-order free deformation or approximated higher-order polynomial deformation is required.

With regard to (3), when an assumption is made to drive a lens in a correction angle range in two axes perpendicular to each other in, for example, the yaw direction and the pitch direction, correction information which occupies a large storage capacity must be held in the form of a two-dimensional geometric deformation amount vector map for each correction angle state. In addition, image distortion varies depending on camera parameters such as a zoom state, an aperture value, and an object distance, and thus, enormous amount of correction information needs to be held in a memory. For example, the improving effect is still limited by discretely holding correction information based on the assumption that correction angle interpolation processing is performed. Thus, when an assumption is made for implementing immediate processing or mounting in an installed apparatus, image distortion correction is not realistic.

With regard to the method for shifting a part of a lens system in a direction perpendicular to the optical axis, measures disclosed in Japanese Patent Laid-Open No. 2012-231262 are insufficient when an attempt is made to correct image distortion with higher precision. The reason for this is that, even when a part of a lens system is shifted in a direction perpendicular to the optical axis, the shape of image distortion varies in response to a lens driving by the adverse effect of the remaining eccentric distortion aberration in terms of the strict interpretation of image distortion. Faithfully handling image distortion without omitting such variation is the key to realize correction with high precision. With the recent advancement of an increase in the screen size and an improvement in high resolution of a display unit and an increase in the number of pixels in an image pickup apparatus itself, image distortion correction needs to be performed with high precision in a situation where a correction error cannot be ignored.

SUMMARY OF THE INVENTION

The present invention provides an image pickup apparatus that corrects image shake by the driving of a correction member and corrects image distortion with high precision in accordance with a combination of simple geometric deformation processings.

According to an aspect of the present invention, an image pickup apparatus that corrects image shake by the driving of a correction member constituting an imaging optical system is provided that includes an image sensing device configured to receive an optical image formed by the imaging optical system so as to photoelectrically convert the optical image into an image signal; an attitude detecting unit configured to detect the attitude of the imaging optical system so as to output detection information; a drive control unit configured to control the driving of the correction member by acquiring detection information output from the attitude detecting unit; a calculating unit configured to decompose distortion of an image imaged by the image sensing device into a first distortion component which varies due to the driving of the correction member and a second distortion component which does not vary due to the driving of the correction member so as to calculate a first correction value for the first distortion component and a second correction value for the second distortion component; and an image processing unit configured to acquire an image signal from the image sensing device and perform image geometric deformation processing using the first correction value and the second correction value acquired from the calculating unit so as to perform image distortion correction.

According to the present invention, an image pickup apparatus that corrects image shake by the driving of a correction member and corrects image distortion with high precision in accordance with a combination of simple geometric deformation processings may be provided.

Further features of the present invention will become apparent from the following description of exemplary embodiments with reference to the attached drawings.

BRIEF DESCRIPTION OF THE DRAWINGS

FIGS. 2A to 2D are schematic diagrams illustrating a three-dimensional movement and attitude change of a correction member.

FIG. 10 is a diagram illustrating the relevance between driving of a correction member and a variation of the image.

FIGS. 11A and 11B are diagrams illustrating changes from the conventional correction model.

DESCRIPTION OF THE EMBODIMENTS

Hereinafter, preferred embodiments of the present invention will be described with reference to the drawings.

First Embodiment

Figure 1:
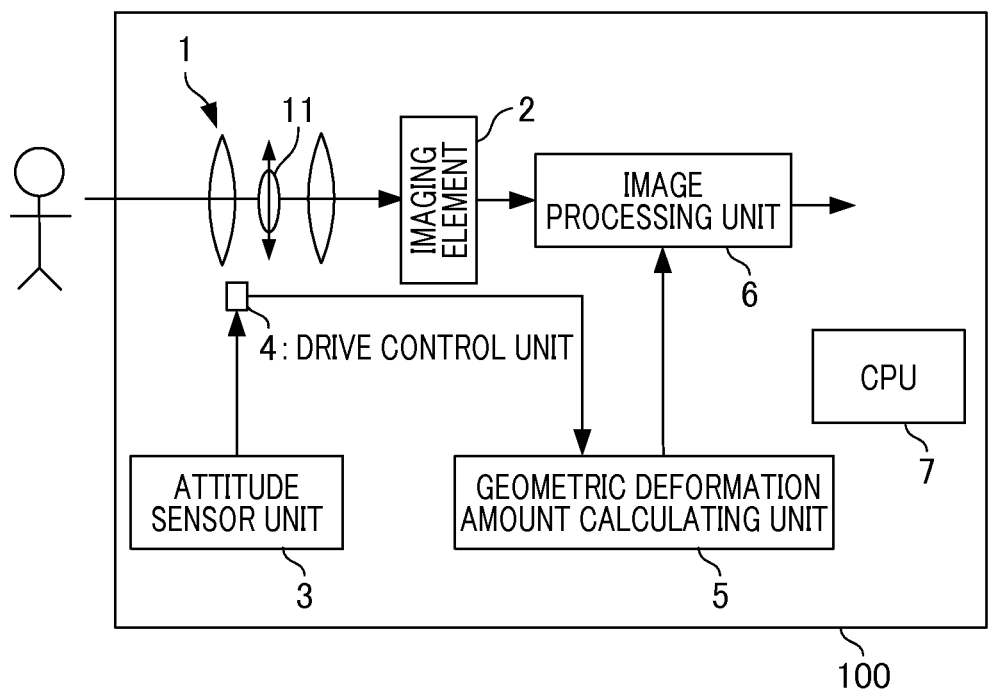
FIG. 1 is a block diagram illustrating an exemplary configuration of an image pickup apparatus in order to explain a first embodiment of the present invention in conjunction with FIGS. 2A to 2D to FIGS. 7A to 7C.

FIG. 1 illustrates an essential part of an image pickup apparatus 100 according to a first embodiment of the present invention. The image pickup apparatus 100 includes an imaging optical system 1 and an image sensing device 2. An attitude sensor unit 3 and an optical image shake correction control and detecting unit (hereinafter referred to as "drive control unit") 4 perform drive control a correction member 11 constituting an image shake correction optical system. Hereinafter, a description will be given of the positional relationship among the respective units based on the assumption that the object side is defined as an optical axis direction front side and the image sensing device 2 side is defined as an optical axis direction rear side in the optical axis direction of the imaging optical system 1.

The imaging optical system 1 is constituted by a plurality of lenses for focusing light from an object onto the image sensing device 2. Upon performing optical image shake correction, control is performed to three-dimensionally move the correction member 11 (correction lens or the like) for correcting image shake or to change the attitude thereof. Examples of movement of the correction member 11 include movement of the correction member 11 in a direction orthogonal to the optical axis, movement of the correction member 11 in the optical axis direction, and movement of the correction member 11 pivoted about a point on the optical axis. For example, the position of an optical image on the image sensing device 2 is subject to a translational movement, so that sway of video due to sway of a camera, which is so-called image shake, is suppressed. A three-dimensional movement of the correction member 11 is realized by a combination of a translational movement (also referred to as "eccentricity") in a direction perpendicular to the optical axis and a forward/backward movement in the optical axis direction. The attitude change of the correction member 11 is realized by tilting the optical axis of the correction member 11 relative to the optical axis of the entire optical system (thus, may also be referred to as "tilting").

Each of FIGS. 2A to 2D is a schematic diagram illustrating trajectories of three-dimensional movement and attitude change of the correction member 11 by a solid line and a dotted line, respectively. FIG. 2A illustrates an exemplary trajectory along which the correction member 11 is shifted (translated) within a plane perpendicular to the optical axis. FIG. 2B illustrates an exemplary trajectory toward which the correction member 11 is pivoted about a point on the optical axis. FIG. 2C illustrates an exemplary trajectory of the trajectory shown in FIG. 2B excluding movement in the forward/backward direction. The intermediate group of the imaging optical system 1 often corresponds to a zooming group, and the movement shown in FIG. 2C corresponds to a trajectory for preventing unintended scaling of an image due to image shake correction. FIG. 2D illustrates an exemplary trajectory along which the eccentricity, the forward/backward movement, and the attitude of the correction member 11 are arbitrarily varied. The trajectory shown in FIG. 2D is employed when the trajectory shown in FIG. 2B or FIG. 2C is varied for optimization based on the zoom state of the image pickup apparatus and the distance (object distance) between the image pickup apparatus and the object.

The imaging optical system 1 shown FIG. 1 converts an optical image formed on the light-receiving plane of the image sensing device 2 into an image signal by photoelectric conversion. The image sensing device 2 is an image sensor using a CCD (charge coupled device) or a CMOS (complementary metal oxide semiconductor) and outputs an image signal to the image processing unit 6.

The attitude sensor unit 3 is constituted by a gyro sensor, an acceleration sensor, and the like and detects the attitude of the image pickup apparatus 100. The attitude sensor unit 3 is attached to any axis orthogonal to, for example, the optical axis of the imaging optical system 1. The attitude sensor unit 3 outputs attitude change detection information to the drive control unit 4. For example, when the attitude sensor is a rotation sensor, the rotation sensor is attached to each axis in the yaw direction and the pitch direction of the image pickup apparatus 100, and measures the attitude change caused by rotation about each axis. Note that the attitude sensor may also be a sensor for measuring the translational movement of the image pickup apparatus such as an acceleration sensor or a sensor for detecting the amount of image shake caused by the translational movement of the image pickup apparatus other than a gyro sensor. The attitude sensor may also be a sensor for detecting the amount of image shake caused by the relative rotation or the translational movement of the image pickup apparatus from the movement vector of the image.

The drive control unit 4 acquires information about the attitude change and/or the positional change of the image pickup apparatus detected by the attitude sensor unit 3. The drive control unit 4 controls the three-dimensional movement and the attitude of the correction member 11 in order to correct image shake caused by the attitude change and/or the positional change of the image pickup apparatus. An image shake correction mechanism unit causes a drive unit such as an electromagnetic coil to move a movable unit including the correction member 11 so as to cancel image shake caused by hand shaking or the like. Furthermore, the drive control unit 4 has a function that detects position/attitude information about the correction member 11. The detecting unit of the correction member 11 includes a Hall element, an encoder, or the like, and measures position and attitude information about the correction member 11 from a position on the trajectory of a lens assembly unit configured to perform optical image shake correction. For example, in the example of a trajectory in a given direction as shown in FIGS. 2A and 2B, a set of the amount of eccentricity of the correction member 11, positional information about the correction member 11 in the forward/backward direction, and attitude information about the correction member 11 is detected from an angle (correction angle) between two axes (rotation axes) in a direction perpendicular to the optical axis of the correction member 11. Since a set of these pieces of information is in a one-to-one correspondence to a correction angle, the correction angle parameter itself may also be handled as detection information to be input to the geometric deformation amount calculating unit 5. In the case of the trajectory shown in FIG. 2C, the amount of eccentricity of the correction member 11, positional information about the correction member 11 in the forward/backward direction, and attitude information about the correction member 11 are detected respectively. When the trajectory varies depending on the zoom state or the object distance, a set of the amount of eccentricity, positional information in the forward/backward direction, and attitude information may also be handled as a correction angle parameter in which these parameters are set as auxiliary variables. Instead of detection information, information about optical image shake correction control may also be approximately acquired so as to perform processing.

A geometric deformation amount calculating unit (hereinafter referred to simply as "calculating unit") 5 calculates a correction value for use in electronic correction of image distortion by an image processing unit 6. The calculating unit 5 calculates a correction value for use in image processing based on detection information acquired from the drive control unit 4, i.e., the correction angle or the amount of eccentricity of the correction member 11, positional information about the correction member 11 in the forward/backward direction, and attitude information about the correction member 11. The correction values for image distortion are as follows:

A first correction value for correcting a first distortion component which varies due to the driving of the correction member 11.

A second correction value for correcting a second distortion component which does not vary due to the driving of the correction member 11 based on the imaging condition (also referred to as "camera parameter") of the image pickup apparatus 100.

The imaging condition of the image pickup apparatus 100 is changed by the zoom state, the aperture value, the object distance, and the like that are held in a memory by a CPU (Central Processing Unit) 7. The CPU 7 performs the general control of the image pickup apparatus 100, reads out a control program from a memory and executes it so as to control the operation of the respective units. The calculating unit 5 decomposes image distortion into a first distortion component and a second distortion component so as to calculate correction values therefor. Note that the function of the calculating unit 5 can be realized as software processing by the CPU 7 executing a program.

The image processing unit 6 acquires the correction value calculated by the calculating unit 5 and then corrects image distortion of the captured image using electronic geometric deformation processing. The image data processed by the image processing unit 6 is temporarily stored in a work memory (DRAM or the like) (not shown) or is directly transmitted to a processing unit at a later stage. The processing unit at a later stage is, for example, an image recording unit consisting of a semiconductor memory or the like, a display unit constituted by a liquid crystal display or the like, and an external input/output I/F (interface) unit. The external input/output I/F unit is connected to an external device via a wireless LAN (Local Area Network) or via a wired cable such as a USB (Universal Serial Bus), or the like.

Hereinafter, a detailed description will be given of the processing for calculating the amount of geometric deformation by the calculating unit 5 and for correcting image distortion by the image processing unit 6 using electronic geometric deformation processing.

Figure 3A:
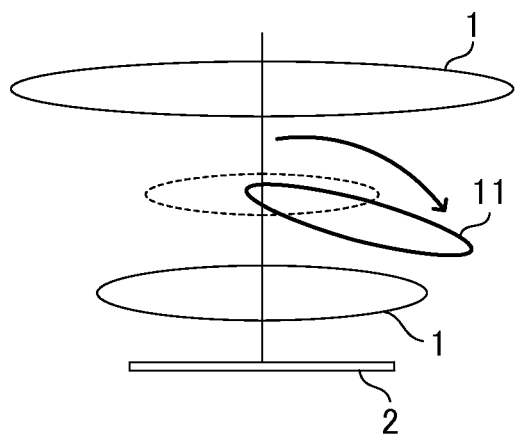
FIGS. 3A and 3B are diagrams illustrating driving of a correction member and an image to which image distortion is imparted by the driving.
Figure 3B:
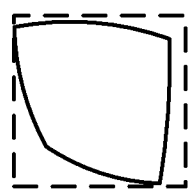

Firstly, a description will be given of image distortion. When the three-dimensional movement and the attitude change of the correction member 11 are performed in order to extend a range of correction over which image shake correction can be performed, image distortion in which the shape of an image complexly varies in response to a lens driving occurs. FIGS. 3A and 3B are schematic diagrams illustrating image distortion. FIG. 3A shows how the correction member 11 is driven by a solid line and a dotted line. The solid line indicates a state in which the correction lens is tilted relative to the optical axis of the imaging optical system 1, and the dotted line indicates a reference state in which the correction angle is zero. FIG. 3B is a conceptual diagram illustrating a variation of the image to which image distortion is imparted by the driving of the correction member 11. The rectangular frame indicated by the dotted line represents the shape of an image in the state where the center of the correction member 11 coincides with the optical axis of the imaging optical system 1. The shape indicated by the solid line represents a state in which an image is distorted by image distortion.

In the paraxial theory of the optical aberration theory, image distortion is expressed as spherical aberration which is a static aberration component, distortion caused by trapezoidal variation which is the primary component of eccentric aberration which varies by the dynamic driving, and an isotropic magnification variation which is the secondary component of eccentric aberration which varies by the dynamic driving in the horizontal direction and the vertical direction. Furthermore, when the correction member 11 plays a role as a scaling factor in the configuration in which a part of the optical system is advanced and retracted in the optical axis direction, unintended isotropic scaling is applied to the image. Other adverse effects caused by variation in the attitude of the correction member 11 by greatly moving the correction member 11 include coma aberration, astigmatism, and significant degradation in the performance of optimal image forming, which non uniformly occurs on an image plane, relating to sharpness and blur due to the tilt of the image plane (conversely, focal plane on the object side). Image distortion can be logically explained in an orderly manner by dividing it into quantitative classification as described above.

However, it is difficult to obtain these variables in the form of numeral values with high precision due to a factor of which an optical system upon lens driving is a non-coaxial system and a factor of which the adverse effect of image distortion at high image height needs to be quantitatively grasped with high precision in imaging optical system applications. It is also difficult to apply the theory to geometric correction of image distortion. For example, even if an attempt is made to calculate the paraxial amount of a lens from three-dimensional information about the lens by means of an optical CAD, the general purpose optical CAD may not cover the output of variables during non-coaxiality. Even if the optical CAD can output variables, variation of image distortion on the image plane cannot be properly expressed when the image pickup apparatus absolutely requires an image having a high image height. In addition, there is no definition from the viewpoint of how the factors divided for each classification affect on an image in what order.

When performing image distortion correction in the conventional technique, image distortion information and correction information are obtained from a deviation of actual shooting with respect to an ideal image point by means of ray tracing with an optical CAD or measurement of the amount of movement of an ideal point on an actual chart under the adverse effect of image distortion. In this case, image distortion information obtained from ray tracing or actual measurement is obtained such that influences exerted by spherical aberration and influences exerted by higher-order (including primary and secondary) eccentric aberration are all included in a mixed form. Consequently, the image distortion correction processing performed by the image processing unit 6 needs to be performed in batch (hereinafter referred to as "batch processing") as shown in FIG. 11A. More specifically, in the case of the example shown in FIG. 2B, the following information needs to be held in a memory as information for expressing geometric deformation for correcting image distortion:

Information about two-dimensional deformation having a high degree of freedom, e.g., information about deformation of a pixel or a representative sampling point or correction vector.

Deformation information expressed by a higher-order three-dimensional polynomial.

For example, a grid is used as a representative sampling point. For the shape of a higher-order two-dimensional deformation, enormous number of correction information needs to be held by taking a correction angle between two axes which are orthogonal to each other as an argument even if the movement and attitude changes of the correction member 11 in a three-dimensional space are restricted to be pivoted about a point on the simple optical axis. In addition, the shape of deformation caused by image distortion may vary depending on camera parameters such as a zoom state, an aperture value, and an object distance, resulting in the occurrence of various types of deformation. Thus, correction information about enormous number of combinations needs to be held in a memory.

Accordingly, in the present invention, a correction model is generated from a phenomenon model as follows:
(1) A step of creating a phenomenon model of an image shake correcting device having an optical image shake correction mechanism which corrects image shake by the driving of the correction member 11.
(2) A step of creating a correction model in reverse order of the phenomenon model.

Firstly, in step (1), a phenomenon model for approximately expressing the phenomenon of image distortion caused by an optical image shake correction mechanism by a combination of simple geometric deformation is constructed. Furthermore, distortion information including the adverse effect of all distortion factors obtained by ray tracing for a design lens using an optical CAD or chart actual shooting is interpreted by being parameterized by the framework of the phenomenon model so as to create a data set. For example, a data set is calculated as parameters by model fitting with respect to image distortion information. More specifically, a model in which image distortion is handled by being classified into a component (dynamic component) which varies due to the driving of the correction member 11 and a component (static component) which does not vary due to the driving of the correction member 11 is created and then interpretation processing by parameterizing these components is performed. Since distortion information varies depending on camera parameters, distortion information needs to be parameterized in the representative state of each camera parameter. With regard to the dynamic component, parameterization processing is performed in the representative state of the correction angle.

In step (2), a correction model is constructed from the phenomenon model, and the image shake correction processing is implemented as installation processing of the image pickup apparatus 100. Furthermore, each of a dynamic component and a static component of image distortion information interpreted as parameters of the phenomenon model is extracted by taking the correction angle and camera parameters as arguments so as to create correction parameters. For example, in the zoom state, N (e.g., 10) states representing the distance from the tele (telephoto) end to the wide (wide-angle) end are parameterized from actual ray tracing information. When the zoom operation in the intermediate state is performed, the parameters in the state closest to the intermediate state are used or linear interpolation processing is performed for parameters in two states adjacent to the intermediate state so as to acquire parameters in the intermediate state.

In the step of creating an optical model, the correction member 11 is firstly three-dimensionally driven, and then modeling of the optical phenomenon in which an optical image generated by the movement and attitude change of the correction member 11 moves is started. Next, the phenomenon is approximately expressed by a combination of simple geometric deformation based on the optical model, so that the phenomenon is simply interpreted by being cut out as individual pieces. Then, a correction model is created in reverse order from the phenomenon model.

Figure 4:
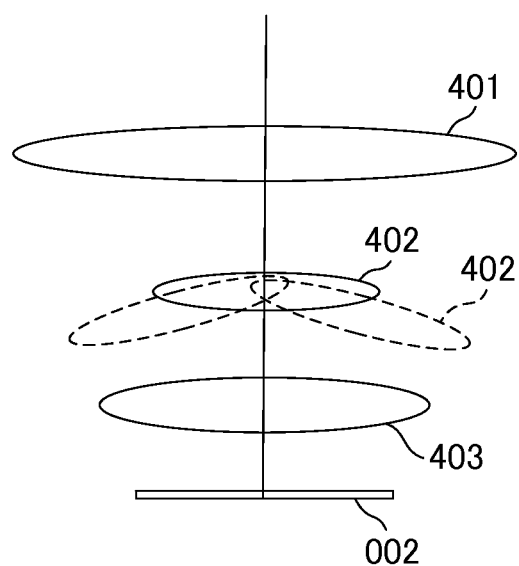
FIG. 4 is a schematic diagram illustrating an optical model.

A description will be given of an optical model and a phenomenon model by taking specific examples. For example, a description will be given of the movement and attitude changes of the correction member 11 when the intermediate group lens of the imaging optical system 1 is expected to be the correction member 11. FIG. 4 schematically illustrates the optical model in which an imaging unit consisting of optical units 401 to 403 assuming a three-group configuration and the image sensing device 2 is abstracted.

The first group unit 401 including a front lens (first lens) is a group for temporarily forming an image by largely bending light beams of an angled optical image from an object, and thus, is a group for forming an image by adding distortion thereto. The second group unit 402 is an intermediate group and includes the correction member 11 which is movable for image shake correction. The correction member 11 can be considered as a relay optical system from the viewpoint of image formation. Thus, the correction member 11 serves to move the position of an image formed by the first group unit 401. Image shake is corrected by the movement of the projected image. In response to the operation of the projected image by a relay lens, distortion in the translational direction and the tilt direction occurs based on the geometric optical principle of the lens. The third group unit 403 serves to reform an image on an image plane by receiving the relayed image.

Figure 5A:
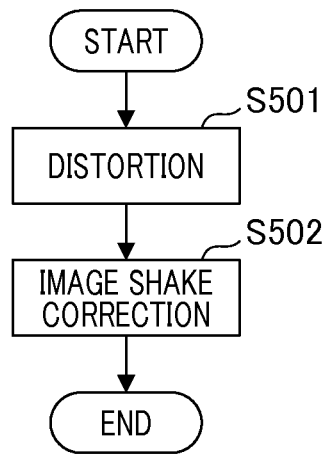
FIG. 5A is a flowchart diagram illustrating a phenomenon model.

When the optical model consisting of such an image formation process is assumed, the developmental processes of image distortion can be shown by the phenomenon model from the viewpoint of image processing which can be interpreted by the flowchart shown in FIG. 5A. Note that an assumption is made that a photographic scene is a static state and only camera shake and driving of the correction member 11 occur dynamically.

In the phenomenon model from the viewpoint of image processing shown in FIG. 5A, distortion occurs in step S501. When light beams pass through the first group unit 401, image magnification varies in each partial region of the image plane due to the difference in angle of incidence between incident light beams. This leads to the occurrence of image distortion. Next in step S502, image shake correction for suppressing hand shaking is performed by translationally moving the relative position of the optical image projected onto the image sensing device 2 by the driving of the second group unit 402. In this case, rotational shaking of the image pickup apparatus is assumed as normal hand shaking. When the second group unit 402 which is an intermediate group is driven, only a translational movement component of hand shaking is corrected by an image shift. Thus, a variation of the image due to tilt and scaling which are the adverse effects on an image by rotational shaking of the image pickup apparatus is not corrected. On the other hand, eccentric distortion aberration which occurs by the driving of the intermediate group is further added as an image motion. Furthermore, when a sequential readout type image sensor such as a CMOS type sensor is used as the image sensing device 2, rolling shutter distortion is added in response to hand shaking. Through these processes, the phenomenon model until a captured image including the effects of hand shaking is generated from an ideal image is described. Hereinafter, a specific description will be given of the steps using the mathematical expression.

The distortion step S501 in FIG. 5A represents the distortion phenomenon generated by the first group unit 401 in the optical model shown in FIG. 4 from the viewpoint of image processing. This distortion is a distortion component which does not vary due to the driving of the correction member 11 and is mainly caused by radial distortion. The effects are expressed by the following formula:

[Formula 1]

$$r_n = \sqrt{(X_n - X_{0n})^2 + (Y_n - Y_{0n})^2} \quad \text{(Formula 1)}$$
$$r_d = f(r_n) r_n$$
$$\begin{bmatrix} X_d \\ Y_d \end{bmatrix} = \frac{r_d}{r_n} \begin{bmatrix} X_n - X_{0n} \\ Y_n - Y_{0n} \end{bmatrix} + \begin{bmatrix} X_{0n} \\ Y_{0n} \end{bmatrix}$$

When coordinate computation of a modeling formula relating to the above distortion is executed, two-dimensional coordinates prior to geometric transformation are polar coordinate transformed on the basis of the transformation center coordinates $X_{0n}$ and $Y_{0n}$. The transformation center $X_{0n}$ and $Y_{0n}$ is set to, for example, the image center. Geometric transformation can be expressed by formula.

The term $f(r_n)$ represented by the second equation of (Formula 1) represents an operation for extracting the ratio value of the ideal image height r, corresponding to the image height and the distortion image height $r_d$ from a data table indexed by the image height. The third equation represents an operation for performing coordinate transformation from polar coordinates to orthogonal coordinates. In practice, a model including a tangential distortion component may further be used.

The image shake correcting step S502 in FIG. 5A, represents image shake correction due to the movement of an image position from the viewpoint of image processing as the correction member 11 of the second group unit 402 shown in FIG. 4 is driven. In step S502, a variation of the image including translation and tilt depending on the correction angle of the correction member 11 occurs. The variation in image includes a distortion component which varies due to the driving of the correction member 11 and translation due to the movement of the image which is the main effect of the image shake correction optical system. As is apparent from the optical model, the tilt axis is caused by an axis offset from the optical axis. Variation in image caused by tilt and translational movements is represented in the equation by the following formula using a homogenous transformation matrix:

[Formula 2]

$$\begin{bmatrix} x' \\ y' \\ m \end{bmatrix} = \begin{bmatrix} f & 0 & 0 \\ 0 & f & 0 \\ 0 & 0 & 1 \end{bmatrix} \begin{bmatrix} 1 & 0 & \tan(\theta y) \\ 0 & 1 & \tan(\theta p) \\ 0 & 0 & 1 \end{bmatrix} \begin{bmatrix} 1 & 0 & sh\phi_y \\ 0 & 1 & sh\phi_p \\ 0 & 0 & 1 \end{bmatrix} \quad \text{(Formula 2)}$$
$$\begin{bmatrix} 1 & 0 & 0 \\ 0 & 1 & 0 \\ \tan(\phi y) & \tan(\phi p) & 1 \end{bmatrix} \begin{bmatrix} 1 & 0 & -sh\phi_y \\ 0 & 1 & -sh\phi_p \\ 0 & 0 & 1 \end{bmatrix}$$
$$\begin{bmatrix} 1/f & 0 & 0 \\ 0 & 1/f & 0 \\ 0 & 0 & 1 \end{bmatrix} \begin{bmatrix} x \\ y \\ 1 \end{bmatrix}$$

The symbols $sh\phi_y$ and $sh\phi_p$ are translational terms of tilt processing by taking into account deviation from the operational axis. The symbol f represents a focal distance of a camera parameter, symbols $\theta_y$ and $\theta_p$ represent translational movement of an image caused by the image shake correction optical system, and symbols $\phi_y$ and $\phi_p$ represent tilt parameters. Suffixes y and p indicate parameters determined by a correction angle in the yaw direction and a correction angle in the pitch direction, respectively, upon driving of the correction member 11. The symbol m represents a scale factor.

During tilt processing by taking into account the operational axis, it is difficult to determined parameters regarding deviation from the operational axis by estimation, so that these parameters can be expressed by the following formula in which these parameters are approximately replaced by anisotropic scaling.

[Formula 3]

$$\begin{bmatrix} x' \\ y' \\ m \end{bmatrix} = \begin{bmatrix} f & 0 & 0 \\ 0 & f & 0 \\ 0 & 0 & 1 \end{bmatrix} \begin{bmatrix} 1 & 0 & \tan(\theta y) \\ 0 & 1 & \tan(\theta p) \\ 0 & 0 & 1 \end{bmatrix} \begin{bmatrix} Sy & 0 & 0 \\ 0 & Sp & 0 \\ 0 & 0 & 1 \end{bmatrix}$$
$$\begin{bmatrix} 1 & 0 & 0 \\ 0 & 1 & 0 \\ \tan(\phi y) & \tan(\phi p) & 1 \end{bmatrix} \begin{bmatrix} 1/f & 0 & 0 \\ 0 & 1/f & 0 \\ 0 & 0 & 1 \end{bmatrix} \begin{bmatrix} x \\ y \\ 1 \end{bmatrix}$$
(Formula 3)

The symbols $S_y$ and $S_p$ are parameters representing anisotropic scaling which is caused by performing tilt processing by taking into account the operational axis on the basis of the image center. When the correction member 11 is advanced or retracted when the correction member 11 is driven, isotropic scaling also needs to be included. When all is included, a variation of the image caused by image shake correction can be expressed by the following formula:

[Formula 4]

$$\begin{bmatrix} x' \\ y' \\ m \end{bmatrix} = \begin{bmatrix} f & 0 & 0 \\ 0 & f & 0 \\ 0 & 0 & 1 \end{bmatrix} \begin{bmatrix} 1 & 0 & \tan(\theta y) \\ 0 & 1 & \tan(\theta p) \\ 0 & 0 & 1 \end{bmatrix} \begin{bmatrix} SSy & 0 & 0 \\ 0 & SSp & 0 \\ 0 & 0 & 1 \end{bmatrix}$$
$$\begin{bmatrix} 1 & 0 & 0 \\ 0 & 1 & 0 \\ \tan(\phi y) & \tan(\phi p) & 1 \end{bmatrix} \begin{bmatrix} 1/f & 0 & 0 \\ 0 & 1/f & 0 \\ 0 & 0 & 1 \end{bmatrix} \begin{bmatrix} x \\ y \\ 1 \end{bmatrix}$$
(Formula 4)

In the above formula, the symbol S is a parameter regarding isotropic scaling and is multiplied by $S_y$ and $S_p$. The phenomenon in the image shake correcting step shown in step S502 in FIG. 5A is a non-point symmetric geometrical variation including tilt correction or anisotropic scaling by taking into account translation and the operational axis and isotropic scaling if necessary.

Figure 5B:
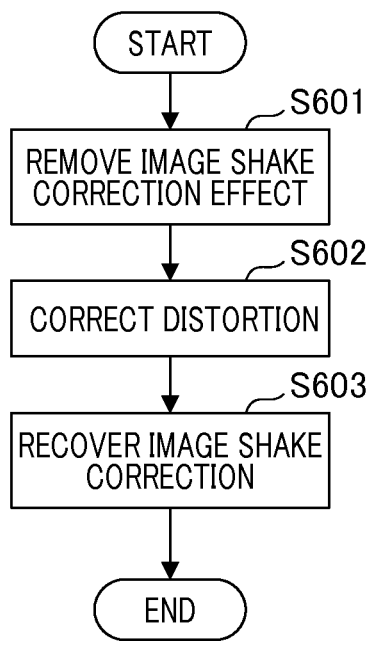
FIG. 5B is a flowchart diagram illustrating a correction model.

The correction model is constructed in reverse order of the above phenomenon model. FIG. 5B is a flowchart illustrating the procedure of correction processing. The image shake correction effect removing step shown in step S601 is a step of removing image distortion represented by translational movement and projection transformation of an image caused by image shake correction. The phenomenon modeled in the image shake correcting step described in step S502 in FIG. 5A is corrected by including translational movement of the image. Projection transformation for image shake correction consists of translation, tilt correction by taking into account the operational axis, and anisotropic scaling. Thus, in step S601, geometric deformation also includes non-point symmetric deformation. When the optical element also moves in the forward/backward direction of the zooming group, geometric deformation also includes isotropic scaling. Reverse transformation of the transformation described with reference to the phenomenon model is the contents of correction processing. Translational movement of the image, which is the main effect of image shake correction, is recovered in step S603 to be described below.

The distortion correcting step shown in step S602 is a step of correcting the adverse effect of the first group unit 401 modeled in distortion step S501 shown in FIG. 5A on distortion. Distortion symmetrical about the reference center coordinates such as radial distortion or tangential distortion is corrected.

The image shake correction recovering step shown in step S603 is a step of recovering the translational movement component of the image shake correction effect temporarily removed for the purpose of geometrical computation in step S601. This step simplifies processing by reflecting the movement of a position to which processing in the image shake correction effect removing step S601 and the distortion correcting step S602 is applied before and after the movement of the position. Thus, when the translational movement component of the image shake correction effect is taken into account in both steps S601 and S602, step S603 and correction of translational movement of the image in step S601 are optional.

The created correction model is finally mounted as a circuit on the image pickup apparatus 100. The parameters in the correction model are obtained by interpreting distortion information including the adverse effect of all distortion factors obtained by ray tracing of an optical CAD for the phenomenon model or chart actual shooting by being parameterized by the framework of the phenomenon model. More specifically, distortion information is classified into a dynamic component which varies due to the driving of the correction member 11 and a static component which does not vary due to the driving of the correction member 11 so as to perform parameterization processing by fitting. For example, the static component of distortion information is obtained by fitting the phenomenon model from the viewpoint of image processing in (Formula 1) to pair-wise relationship between an ideal image point and an actual image point of ray tracing information obtained by the optical CAD in the state where the correction angle is zero and the center of the correction member 11 coincides with the optical axis of the imaging optical system 1.

Figure 6A:
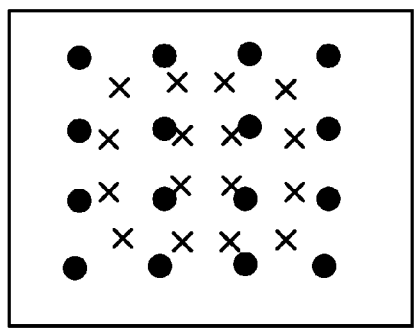
FIGS. 6A and 6B are diagrams illustrating ray tracing information when dynamic and static distortion components are determined.

FIG. 6A is a schematic diagram illustrating the result of ray tracing information for determining distortion information which is a static component. In FIG. 6A, the points indicated by black circles represent ideal image points and the "x" marks represent image point information including distortion when the correction angle is zero. For example, in the case of radiation distortion, f(r) relating to image distortion is determined from the relationship between positional shift between corresponding points as an image height-related parameter. Two-dimensional coordinates are polar coordinate transformed on the basis of the image center $X_{On}$ and $Y_{On}$ so as to determine a parameter from a plurality of coordinate offset information by means of the least square method. Furthermore, fitting is executed for each of representative sampling states for camera parameters including a zoom state, an aperture value, and an object distance, so that a set of parameters for the phenomenon model can be obtained.

On the other hand, the variation caused by a correction angle is further applied to a component which is modeled by dynamic image shake correction in the representative sampling states for camera parameters including a zoom state, an aperture value, and an object distance. For example, parameterization processing is performed using the ray tracing information obtained by the optical CAD.

Figure 6B:
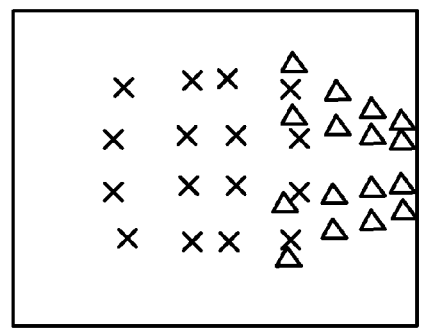

FIG. 6B is a schematic diagram illustrating the result of ray tracing information for determining a projection transformation parameter which is a dynamic component and relates to image shake correction. The "x" marks represent image point information including distortion when the correction angle is zero. The triangular points represent image points, including the adverse effect of static distortion, moved by the driving of the correction member 11. Components which are modeled by dynamic image shake correction can be determined from ray tracing information in accordance with the correction processing procedure assumed in FIG. 11B based on an interpretation of the optical model in FIG. 4. In other words, in the present invention, distortion correction which has been performed by batch processing is divided into projection deformation regarding the dynamic component of image distortion and distortion correction regarding the non-dynamic (static) component, and then, the projection deformation and the distortion correction are sequentially executed.

Figure 7A:
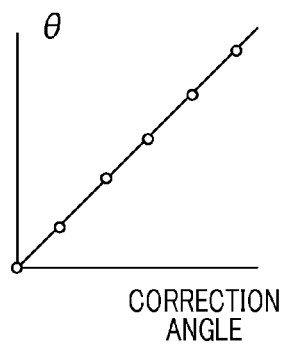
FIGS. 7A to 7C are diagrams illustrating dynamic image distortion component parameter tables.
Figure 7B:
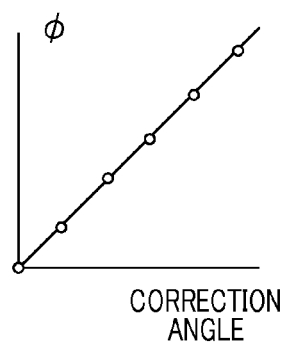
Figure 7C:
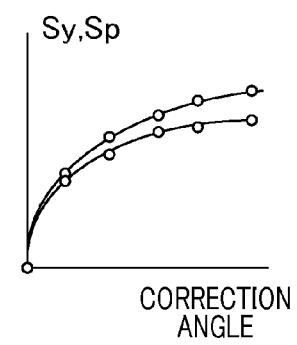

FIGS. 7A to 7C are graphs illustrating a projection transformation parameter using a correction angle determined by fitting as an argument, i.e., table data of a dynamic image distortion component. FIGS. 7A to 7C show examples in which the representative sampling state of a correction angle corresponding to a camera parameter is obtained by fitting. FIG. 7A is a graph illustrating a translation parameter, FIG. 7B is a graph illustrating a tilt parameter, and FIG. 7C is a graph illustrating an anisotropic scaling parameter.

Through the above processing, parameters of components modeled by dynamic image shake correction for a correction angle are obtained. As shown in FIG. 2D, when the eccentricity, the forward/backward movement, and the tilting of the correction member 11 are arbitrarily varied, the number of parameters for the holding state can be reduced. More specifically, the isotropic scaling parameter of the projection transformation component relates solely to the forward/backward movement of the correction member 11 as shown in FIG. 10. FIG. 10 is a conceptual diagram illustrating the relationship among three types of tilting, eccentricity, and forward/backward movement caused by the driving of the correction member 11 and a variation of the image. The forward/backward movement involves in isotropic scaling of the image but has no relevance to tilting and eccentricity. On the other hand, eccentricity and tilting have relevance therebetween, and thus, tilt by taking into account the translational movement and the operational axis of the image or projection deformation consisting of a set of anisotropic scaling and tilt can be associated with a variation of the image.

Upon actual correction, the image processing unit 6 performs image distortion correction in accordance with the correcting steps shown in FIG. 5B. For the projection transformation parameter used in the image shake correction effect removing step S601, a processing parameter is obtained by using camera parameters consisting of a zoom state, an aperture value, and an object distance and the correction angle of the correction member 11 corresponding thereto as arguments. Likewise, for the parameter used in the distortion correcting step S602, correction is performed by obtaining a processing parameter using camera parameters consisting of a zoom state, an aperture value, and an object distance as arguments.

In the present embodiment, phenomenon model construction, and correction model construction which is the other way around, and dropping distortion information in which all the factors are mixed into model parameters lead to simplification of the model. In the case of the model for performing batch processing for all factors, a geometric transformation circuit which is capable of performing higher-order free deformation or approximated higher-order polynomial deformation must be needed. In the present embodiment, higher-order free deformation or approximated higher-order polynomial deformation is replaced with the phenomenon model and the correction model, so that a combination of projection transformation and simple geometric deformation expressed by one-dimensional nonlinear equation in the point-symmetric polar coordinate system is obtained. In this manner, correction processing can be expressed based on the phenomenon model.

In the present embodiment, deformation parameters are handled by fitting the phenomenon model or the correction model to distortion information including the adverse effect of all distortion factors, so that the number of parameters required for being held for correction can be significantly reduced. More specifically, in the case of the model of batch processing, correction information needs to be held in the form of a two-dimensional geometric deformation amount vector map for each correction angle state of lens driving in a correction angle range in two axes perpendicular to each other in, for example, the yaw direction and the pitch direction. In addition, image distortion varies depending on camera parameters such as a zoom state, an aperture value, and an object distance, and thus, correction information to be held in a memory further increases. In contrast, in the present embodiment, correction information is handled as parameters of the phenomenon model or the correction model, so that the number of parameters can be significantly reduced. For example, the projection transformation parameter which is the dynamic component (first distortion component) of image distortion needs to be held by using the correction angle as an argument, but only one-dimensional parameters orthogonal to each other are sufficient to be held from the symmetry thereof. On the other hand, the distortion component which is the static component (second distortion component) of image distortion is invariant to the correction angle of the correction member 11, and thus, correction information for camera parameters such as a zoom state, an aperture value, and an object distance only needs to be held. For individual processing, only static distortion in the reference state where the correction angle is zero needs to be taken into account. Thus, faithful correction may also be made for a simple model for handling only point-symmetric radial distortion. Thus, correction information can be significantly reduced.

In the present embodiment, image distortion is decomposed into the first distortion component which varies due to the driving of the correction member 11 and the second distortion component which does not vary due to the driving of the correction member 11. The state of the correction member 11 is detected as a set of the amount of eccentricity, longitudinal position, and attitude information of the correction member 11 obtained from the drive control unit 4 or correction angle in formation. The calculating unit 5 calculates correction values for distortion components in accordance with the correction model, and the image processing unit 6 electronically corrects the first distortion component and the second distortion component based on these correction values. Thus, image distortion can be corrected with resources such as small data storage capacity with high precision in accordance with a combination of simple geometric deformation processings which are implementable for three-dimensional movement and attitude change of the correction member 11.

Second Embodiment

Next, a description will be given of a second embodiment of the present invention. Among the constituting parts of an image pickup apparatus 900 according to the present embodiment, the already used reference numerals are used for the same constituting parts as those of the image pickup apparatus 100 according to the first embodiment, and a detailed description thereof will be omitted herein. Hereinafter, a description will be given of processing performed by a geometric deformation amount calculating unit 905 and an image processing unit 906 which are different from the first embodiment.

Figure 8:
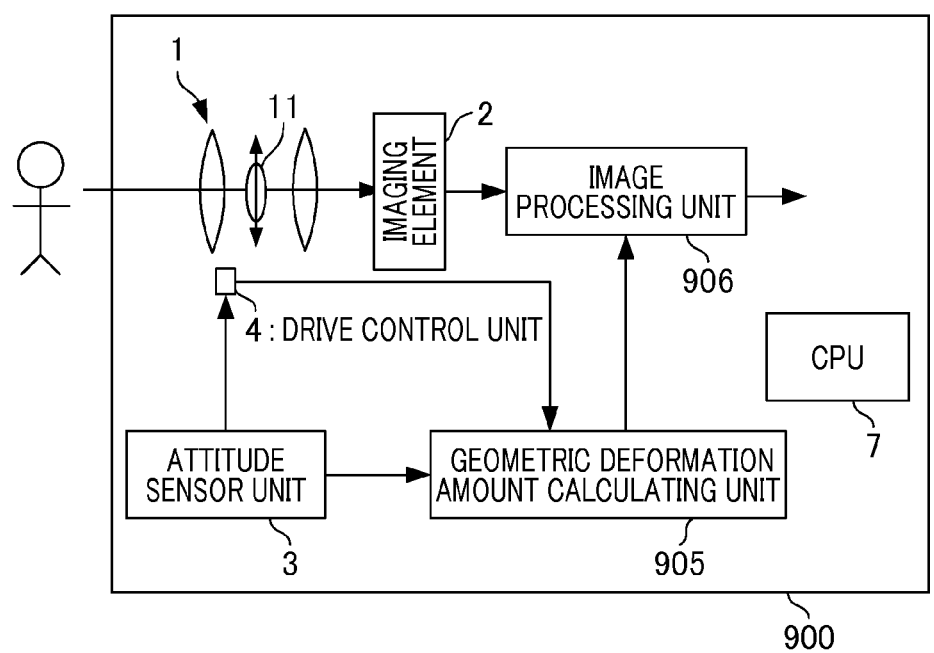
FIG. 8 is a block diagram illustrating an exemplary configuration of an image pickup apparatus according to a second embodiment of the present invention.

The geometric deformation amount calculating unit (hereinafter referred to as "calculating unit") 905 shown in FIG. 8 calculates a correction value used for electronic correction of image distortion performed by the image processing unit 906. The calculating unit 905 acquires the correction angle or the amount of eccentricity, longitudinal position, and attitude information of the correction member 11 measured by the drive control unit 4 so as to calculate a first correction value for a first distortion component which varies due to the driving of the correction member 11. The calculating unit 905 also calculates a second correction value for a second distortion component which does not vary due to the driving of the correction member 11 based on camera parameters such as a zoom state, an aperture value, and an object distance held by the CPU 7. Also, the calculating unit 905 acquires attitude detection information from the attitude sensor unit 3 so as to determine an image shake correction value (third correction value). The attitude detection information obtained from the attitude sensor unit 3 includes detection information such as hand shaking and sway of the image pickup apparatus. As described above, the calculating unit 905 decomposes image distortion to calculate a correction value for each factor. The image processing unit 906 acquires the first to third correction values from the calculating unit 905, and executes electronic correction processing for image data output from the image sensing device 2 by geometric deformation.

A description will be given of the phenomenon model from the viewpoint of image processing according to the present embodiment with reference to the flowchart in FIG. 9A. A detailed description of the constituting parts as those in the phenomenon model according to the first embodiment will be omitted. A description will be mainly given of step S1000.

Assume that vibration occurs in the image pickup apparatus due to hand shaking in step S1000. The vibration causes visual field changes and viewpoint changes in an image incident on the opening of the lens. When light beams pass through the first lens group of the image-taking lens, image distortion occurs in step S501 due to the difference in angle of incidence between incident light beams. Image distortion is a component caused by differences in image magnification for each partial region of the image plane. In step S502, image shake correction control is performed by translationally moving the relative position of the optical image projected onto the image sensing device 2 by the driving of the intermediate group including the correction member 11. In general, rotational shaking of the image pickup apparatus is assumed as normal hand shaking. When the intermediate group is driven, only a translational movement component of hand shaking is corrected by an image shift. Thus, a variation of the image due to tilt and scaling which are the adverse effects on an image of rotational shaking of the image pickup apparatus is not corrected. On the other hand, eccentric distortion aberration which occurs by the driving of the intermediate group is further added as an image motion. Finally, when a sequential readout type image sensor is used as the image sensing device 2, rolling shutter distortion is added in response to hand shaking. Through these processes, the phenomenon model until a captured image including the effects of hand shaking is generated from an ideal image is obtained.

The vibration step shown in step S1000 is a change in image appearance caused by a change in relative positional relationship between the image pickup apparatus 900 and the object and is identical to image shake from the viewpoint of phenomenon. A two-dimensional variation of image shake can be described by a homography matrix which is a matrix of three rows and three columns. For example, assume the case where a relative motion between the image pickup apparatus and the object is three-axis rotation. The homography matrix H of geometric deformation parameters is given as shown in the following formula:

[Formula 5]

$$H = \begin{bmatrix} a & b & c \\ d & e & f \\ g & h & i \end{bmatrix} = \begin{bmatrix} \cos(-R) & -\sin(-R) & 0 \\ \sin(-R) & \cos(-R) & 0 \\ 0 & 0 & 1 \end{bmatrix}$$ (Formula 5)

$$\begin{bmatrix} 1 & 0 & 0 \\ 0 & \cos(-P) & -\sin(-P) \\ 0 & \sin(-P) & \cos(-P) \end{bmatrix} \begin{bmatrix} \cos(-Y) & 0 & \sin(-Y) \\ 0 & 1 & 0 \\ -\sin(-Y) & 0 & \cos(-Y) \end{bmatrix}$$

$$\begin{bmatrix} X'_{0h} \\ Y'_{0h} \\ m \end{bmatrix} = H \begin{bmatrix} X_r - X_{0h} \\ Y_r - Y_{0h} \\ 1 \end{bmatrix} + \begin{bmatrix} X_{0h} \\ Y_{0h} \\ 0 \end{bmatrix}$$

$$\begin{bmatrix} X''_h \\ Y''_h \end{bmatrix} = \begin{bmatrix} X'_h / m \\ Y'_h / m \end{bmatrix}$$

The symbols R, P, and Y shown in the rotation matrix in the above formula are the angles of rotation of the camera in the roll direction, the pitch direction, and the yaw direction, respectively, with respect to the optical axis. The symbols $X_{0h}$ and $Y_{0h}$ are the transformation center coordinates. The transformation center is typically set to the image center. A known technique is used for a physical relationship between a value indicating a relative positional relationship between the image pickup apparatus and the object and a homography element.

Next, a description will be given of a correction model and correction processing based thereon with reference to the flowchart in FIG. 9B. Since steps S601, S602, and S603 are the same as has been described in FIG. 5B, a description will be mainly given of step S1103 which is different from the first embodiment.

Figure 9A:
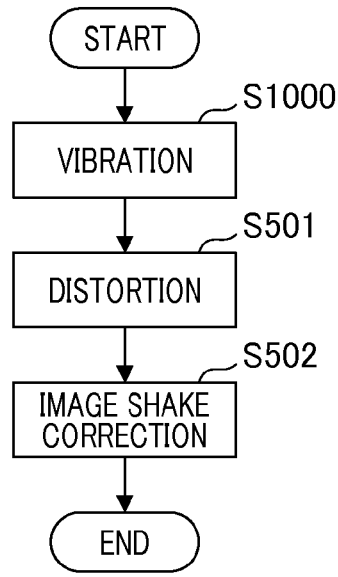
FIG. 9A is a flowchart diagram illustrating a phenomenon model according to a second embodiment.

The image shake correcting step in step S1103 is a step of correcting a change in image appearance caused by a change in relative positional relationship between the image pickup apparatus and the object other than the translational movement to be subject to image shake correction modeled in step S502 shown in FIG. 9A. For example, tilt of the image, scaling of the image, and rotation of the image about the optical axis as the center of rotation, which are caused by rotation of the image pickup apparatus, are image shake which is not corrected by optical image shake correction, and thus, are corrected in step S1103.

More specifically, assume the case where a relative motion between the image pickup apparatus and the object is three-axis rotation. In this case, the homography matrix H of geometric deformation parameters is given as shown in the following formula, where the symbol a represents an anti-vibration ratio (which represents suppression if the sign of a is positive). It should be noted that the elements in one row and three columns and the elements in two rows and three columns, which are the translational terms of the homography matrix H, have already been sufficiently corrected by optical image shake correction, and thus, electronic correction is not performed for these elements.

[Formula 6]

$$H = \begin{bmatrix} a & b & c \\ d & e & f \\ g & h & i \end{bmatrix} = \begin{bmatrix} \cos(\alpha R) & -\sin(\alpha R) & 0 \\ \sin(\alpha R) & \cos(\alpha R) & 0 \\ 0 & 0 & 1 \end{bmatrix} \quad \text{(Formula 6)}$$

$$\begin{bmatrix} 1 & 0 & 0 \\ 0 & \cos(\alpha P) & -\sin(\alpha P) \\ 0 & \sin(\alpha P) & \cos(\alpha P) \end{bmatrix} \begin{bmatrix} \cos(\alpha Y) & 0 & \sin(\alpha Y) \\ 0 & 1 & 0 \\ -\sin(\alpha Y) & 0 & \cos(\alpha Y) \end{bmatrix}$$

Note that $H(1, 3) = H(2, 3) = 0$.

Figure 9B:
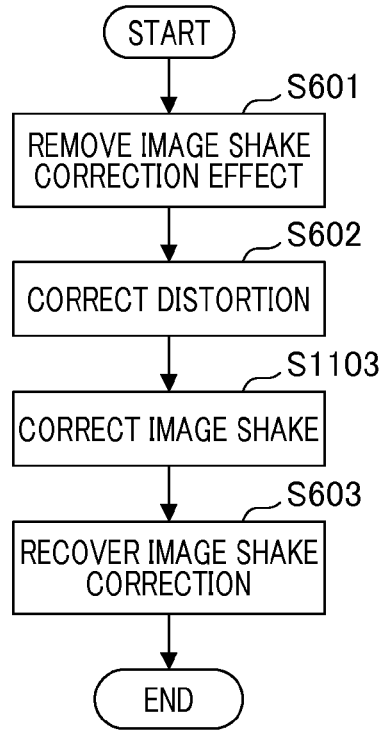
FIG. 9B is a flowchart diagram illustrating a correction model according to the second embodiment.

The image shake correction effect removing step S601 shown in FIG. 9B is a step of removing image distortion represented by translational movement and projection transformation of an image caused by image shake correction. The phenomenon model modeled in the image shake correcting step shown step S502 in FIG. 9A is corrected by including translational movement of the image. Projection transformation for image shake correction consists of translation, tilt correction by taking into account the operational axis, and anisotropic scaling. Thus, geometric deformation also includes non-point symmetric deformation. When the optical element also moves in the forward/backward direction of the zooming group, geometric deformation also includes isotropic scaling. Subsequent to step S601, the distortion correcting step S602 and the image shake correcting step S1103 are performed in the reverse order of the phenomenon model. Translational movement of the image, which is the main effect of image shake correction, is recovered in step S603. A circuit is mounted on the calculating unit 905 based on the above correction model and executes processing in steps shown in FIG. 9B.

According to the present embodiment, not only image distortion but also a hand shaking component other than a translational component are corrected, so that high quality image shake correction can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-140843, filed on Jul. 4, 2013, which is hereby incorporated by reference herein in its entirety.

What is claimed is:

1. An image pickup apparatus that corrects image shake by the driving of a correction member constituting an imaging optical system, the image pickup apparatus comprising:
   an image sensing device configured to receive an optical image focused by the imaging optical system so as to photoelectrically convert the optical image into an image signal;
   an attitude detecting unit configured to detect the attitude of the imaging optical system so as to output detection information;
   a drive control unit configured to control the driving of the correction member by acquiring the detection information output from the attitude detecting unit;
   a calculating unit configured to decompose distortion of an image imaged by the image sensing device image into a first distortion component which varies due to the driving of the correction member and a second distortion component which does not vary due to the driving of the correction member so as to calculate a first correction value for the first distortion component and a second correction value for the second distortion component; and
   an image processing unit configured to acquire the image signal from the image sensing device and perform image distortion correction by performing image geometric deformation processing using the first correction value and the second correction value acquired from the calculating unit.

2. The image pickup apparatus according to claim 1, wherein the drive control unit drives the correction member in a three-dimensional manner including eccentricity, tilting, and forward/backward movement with respect to the optical axis of the imaging optical system.

3. The image pickup apparatus according to claim 1, wherein the calculating unit calculates the first correction value using the angle of the correction member to an axis in a direction perpendicular to the optical axis of the imaging optical system as a parameter.

4. The image pickup apparatus according to claim 1, wherein the calculating unit calculates the second correction value using an imaging condition of the image pickup apparatus as a parameter.

5. The image pickup apparatus according to claim 1, wherein the image processing unit performs the image distortion correction after performing processing for removing an image shake correction effect produced by the correction member and further performs processing for recovering the image shake correction effect.

6. The image pickup apparatus according to claim 1, wherein the calculating unit acquires detection information output from the attitude detecting unit, and then calculates a third correction value for a variation of the image caused by the change in the relative positional relationship between the image pickup apparatus and an object, and
   wherein the image processing unit performs the image distortion correction after performing processing for removing an image shake correction effect produced by the correction member, corrects variation of the image using the third correction value acquired from the calculating unit, and further performs processing for recovering the image shake correction effect.

7. The image pickup apparatus according to claim 1, wherein the image processing unit performs geometric deformation for the non-point-symmetric first distortion component by means of projection transformation.

8. The image pickup apparatus according to claim 1, wherein the image processing unit corrects distortion, which is symmetric to a reference center coordinate, for the second distortion component.

9. The image pickup apparatus according to claim 7, wherein the geometric deformation by means of the projection transformation includes translation, tilt, or isotropic scaling and anisotropic scaling in a horizontal direction and a vertical direction.

10. The image pickup apparatus according to claim 1, wherein the drive control unit detects an amount of eccentricity of the correction member, position about the correction member in the optical axis direction, attitude information about the correction member, or correction angle information and then outputs detection information to the calculating unit, and
   wherein the calculating unit acquires the detection information, and associates a variation of the image caused by the eccentricity or tilting or forward/backward movement of the correction member with projection deformation.

11. The image pickup apparatus according to claim 10, wherein the image processing unit performs processing in the order of projection deformation and distortion correction.

12. A control method to be executed by an image pickup apparatus that corrects image shake by the driving of a correction member constituting an imaging optical system, the method comprising:
- receiving an optical image focused by the imaging optical system and photoelectrically converting the optical image into an image signal by an image sensing device;
- detecting the attitude of the imaging optical system by an attitude detecting unit;
- controlling the driving of the correction member by acquiring detection information output in the detecting;
- decomposing distortion of an image imaged by the image sensing device into a first distortion component which varies due to the driving of the correction member and a second distortion component which does not vary due to the driving of the correction member, and calculating a first correction value for the first distortion component and a second correction value for the second distortion component; and
- acquiring the image signal from the image sensing device and performing image distortion correction by performing image geometric deformation processing using the first correction value and the second correction value calculated in the calculating.

* * * * *